US012779418B2

(12) United States Patent
Kolar et al.

(10) Patent No.: US 12,779,418 B2
(45) Date of Patent: Nov. 3, 2026

(54) AUXILIARY COOLING FAN FOR A BLENDING SYSTEM

(71) Applicant: VITA-MIX MANAGEMENT CORPORATION, Olmsted Township, OH (US)

(72) Inventors: David Kolar, Stow, OH (US); Fred H. Mehlman, Brunswick, OH (US); Bradford J. Paskert, Olmstead Falls, OH (US)

(73) Assignee: Vita-Mix Management Corporation, Olmsted Township, OH (US)

( * ) Notice: Subject to any disclaimer, the term of this patent is extended or adjusted under 35 U.S.C. 154(b) by 118 days.

(21) Appl. No.: 18/518,101

(22) Filed: Nov. 22, 2023

(65) Prior Publication Data

US 2024/0082800 A1 Mar. 14, 2024

Related U.S. Application Data

(63) Continuation of application No. 17/019,682, filed on Sep. 14, 2020, now Pat. No. 11,865,504, which is a continuation of application No. 15/486,344, filed on Apr. 13, 2017, now Pat. No. 10,773,227.

(60) Provisional application No. 62/321,925, filed on Apr. 13, 2016.

(51) Int. Cl.

| | |
|---|---|
| ***A47J 43/046*** | (2006.01) |
| ***A47J 43/07*** | (2006.01) |
| ***B01F 27/80*** | (2022.01) |
| ***B01F 35/21*** | (2022.01) |
| ***B01F 35/212*** | (2022.01) |
| ***B01F 35/32*** | (2022.01) |
| ***B01F 35/92*** | (2022.01) |
| *B01F 35/90* | (2022.01) |

(52) U.S. Cl.
CPC ............. *B01F 35/92* (2022.01); *A47J 43/046* (2013.01); *A47J 43/0716* (2013.01); *B01F 27/80* (2022.01); *B01F 35/2115* (2022.01); *B01F 35/212* (2022.01); *B01F 35/3204* (2022.01); *B01F 35/3213* (2022.01); *B01F 2035/98* (2022.01)

(58) Field of Classification Search
CPC ............................ A47J 43/046; A47J 43/0716
USPC ......................... 366/144, 145, 205, 206, 314
See application file for complete search history.

(56) References Cited

U.S. PATENT DOCUMENTS 1,911,471 A * 5/1933 Sacrey .................... H02K 9/06 417/423.1
2,157,609 A 5/1939 Hopkins
2,822,485 A 2/1958 Braun
2,955,186 A 10/1960 Ritter
3,289,920 A 12/1966 Boivie
3,299,226 A 1/1967 Edwards
3,493,214 A 2/1970 Edwards
3,548,280 A 12/1970 Cockroft
3,575,524 A 4/1971 Adajian
3,731,059 A 5/1973 Wilson
3,934,758 A * 1/1976 Kipp .................... B67D 1/0858 366/279
3,943,421 A 3/1976 Shibata et al.
3,951,351 A 4/1976 Ernster et al.
3,952,534 A * 4/1976 Jacobs .................... F25D 23/12 477/17
4,071,789 A 1/1978 Erster
4,305,670 A 12/1981 Moskowitz
4,568,193 A 2/1986 Contri et al.
4,686,356 A 8/1987 Ueda et al.
4,762,057 A 8/1988 Hirota et al.
4,783,173 A 11/1988 Artin
4,822,172 A 4/1989 Stottmann
4,893,942 A 1/1990 Stottmann
4,903,589 A * 2/1990 Aoyama ................ A21B 7/005 99/468
4,968,864 A 11/1990 Doi et al.
5,084,641 A 1/1992 Saima
5,124,600 A 6/1992 Hedeen
5,156,867 A 10/1992 Leuthold et al.
(Continued)

FOREIGN PATENT DOCUMENTS

| | | | |
|---|---|---|---|
| CN | 204394315 | U | 6/2015 |
| CN | 105411433 | A | 3/2016 |
| EP | 1647217 | A1 | 4/2006 |
| EP | 2754535 | A2 | 7/2014 |
| KR | 101144174 | B1 | 5/2012 |

OTHER PUBLICATIONS

Santos, Brushless Blender 62—Description and Technical Specifications (Wayback Machine Web Archive Capture), https://web.archive.org/web/20150220051208/http://www.santos.fr/en/products/fresh-drinks/blenders/blender•brushless/62/, Feb. 20, 2015, pp. 1-2.
Santos, Santos Brushless Blender #62 Menu and Recipe Programming Guide (Wayback Machine Internet Archive Capture), https://web.archive.org/web/20160912181030/http://www.santos.fr/media/ftp/Users_manuals/EN_English/SANTOS_62-manu-EN-menus.pdf, Sep. 12, 2016, pp. 1-4.
(Continued)

*Primary Examiner* — David L Sorkin
(74) *Attorney, Agent, or Firm* — Dinsmore & Shohl LLP

(57) ABSTRACT

Provided are blender systems and methods that selectively control fan operation within the blender systems. For example, a blender system includes at least a fan, a blade assembly, and a motor used to operatively drive the blade assembly for blending. Operation of the fan may be independent of the operation of the motor. One or more operating parameters of the fan may be adjusted to selectively control the operation of the fan when one or more conditions are met. Adjusting the one or more operating parameters of the fan may include increasing or decreasing a speed of the fan. Further, adjusting the one or more operating parameters of the fan may include powering on or powering off the fan.

13 Claims, 7 Drawing Sheets

(56) References Cited

U.S. PATENT DOCUMENTS

| | | | | | |
|---|---|---|---|---|---|
| 5,267,211 | A | | 11/1993 | Kobayashi et al. | |
| 5,267,790 | A | | 12/1993 | Sutherland et al. | |
| 5,273,358 | A | | 12/1993 | Byrne | |
| 5,316,382 | A | | 5/1994 | Penaranda et al. | |
| 5,347,205 | A | | 9/1994 | Piland | |
| 5,351,606 | A | * | 10/1994 | Matsuzaki | A21B 7/005 366/601 |
| 5,363,746 | A | | 11/1994 | Gordon | |
| 5,392,695 | A | | 2/1995 | Junkel | |
| 5,415,081 | A | * | 5/1995 | Yoshida | A21B 7/005 99/348 |
| 5,445,061 | A | | 8/1995 | Barradas | |
| 5,531,153 | A | | 7/1996 | Maruyama et al. | |
| 5,556,198 | A | | 9/1996 | Dickson, Jr. et al. | |
| 5,562,020 | A | | 10/1996 | Shigeshiro | |
| 5,577,735 | A | | 11/1996 | Reed et al. | |
| 5,590,583 | A | | 1/1997 | Harrison | |
| 5,605,090 | A | | 2/1997 | Mantani et al. | |
| 5,660,467 | A | | 8/1997 | Mineo et al. | |
| 5,735,190 | A | * | 4/1998 | Sham | A21B 7/005 366/144 |
| 5,768,978 | A | | 6/1998 | Dorner et al. | |
| 5,829,341 | A | | 11/1998 | Lin | |
| 5,839,356 | A | | 11/1998 | Dornbush et al. | |
| 5,865,383 | A | | 2/1999 | Ford | |
| 5,967,021 | A | | 10/1999 | Yung | |
| 6,095,677 | A | | 8/2000 | Karkos, Jr. | |
| 6,155,113 | A | | 12/2000 | Swon | |
| 6,210,033 | B1 | | 4/2001 | Karkos, Jr. et al. | |
| 6,364,522 | B2 | | 4/2002 | Kolar et al. | |
| 6,402,365 | B1 | | 6/2002 | Wong | |
| 6,595,113 | B1 | | 7/2003 | Chang | |
| 6,609,821 | B2 | | 8/2003 | Wulf et al. | |
| 6,959,562 | B2 | | 11/2005 | Navedo et al. | |
| 7,422,362 | B2 | | 9/2008 | Sands | |
| 8,151,693 | B2 | | 4/2012 | Sala | |
| 8,334,626 | B2 | | 12/2012 | Lange | |
| 8,348,727 | B2 | | 1/2013 | Trautner | |
| 10,773,227 | B2 | | 9/2020 | Kolar | |
| 2001/0002892 | A1 | | 6/2001 | Karkos, Jr. | |
| 2002/0009017 | A1 | | 1/2002 | Kolar et al. | |
| 2002/0027175 | A1 | * | 3/2002 | Capp | A47J 43/046 241/199.12 |
| 2002/0176320 | A1 | | 11/2002 | Wulf et al. | |
| 2002/0189460 | A1 | | 12/2002 | Brown | |
| 2004/0203387 | A1 | | 10/2004 | Grannan | |
| 2005/0229795 | A1 | | 10/2005 | Stuckey | |
| 2006/0086843 | A1 | | 4/2006 | Lin et al. | |
| 2006/0169715 | A1 | | 8/2006 | Emmendorfer et al. | |
| 2006/0203610 | A1 | | 9/2006 | Bohannon et al. | |
| 2006/0214765 | A1 | | 9/2006 | Pitchers et al. | |
| 2007/0221668 | A1 | | 9/2007 | Baarman et al. | |
| 2008/0163767 | A1 | | 7/2008 | Wu Chang | |
| 2008/0221739 | A1 | | 9/2008 | Pryor | |
| 2009/0225626 | A1 | | 9/2009 | Baumfalk | |
| 2011/0189358 | A1 | | 8/2011 | Herbert | |
| 2011/0199852 | A1 | | 8/2011 | Martin | |
| 2011/0248108 | A1 | | 10/2011 | Carriere | |
| 2012/0205475 | A1 | | 8/2012 | Wu | |
| 2013/0192477 | A1 | | 8/2013 | Hoare | |
| 2014/0235145 | A1 | | 8/2014 | Bosch | |
| 2015/0265987 | A1 | | 9/2015 | Kidd | |
| 2019/0021551 | A1 | | 1/2019 | Guo et al. | |

OTHER PUBLICATIONS

Hamilton Beach Brands, Inc., HBH850 Series Summit High-Performance Blender (Marketing/Product Sheet), 2012, pp. 1-2.

Hamilton Beach Brands, Inc., HBH850 Summit Blender Technical Information Series A-K (Technical Data Sheet) Production Release, Apr. 16, 2012, pp. 1-7.

Hamilton Beach Brands, Inc., HBH850-230V Blender Technical Information Series A-N (Specification), Jul. 20, 2013, pp. 1-10.

Hamilton Beach Commercial, Model HBH850 Bar Blender Operation Manual, Nov. 2007, pp. 1-19.

Hamilton Beach Brands, Inc., Parts & Accessories Diagram—HBH850 (Replace Upper Housing part No. and add Quiet Shield absorbers), Jan. 31, 2017, pp. 1-2.

Hamilton Beach Brands, Inc., Parts & Accessories Diagram—HBH850 (Thumb Screw Kit, Jar Sensor and 48 oz container), Sep. 16, 2013, pp. 1-2.

Hamilton Beach Brands, Inc., Parts & Accessories Diagram—HBH850 (Update VFD Board with Touch Pad Part Number), Feb. 28, 2017, pp. 1-2.

Hamilton Beach HBH850 Product Specification PDF (Wayback Machine Web Archive Capture), https://web.archive. org/web/20150922022233/http://static.katomcdn.com/pdf/041-HBH850, Sep. 22, 2015.

Hamilton Beach Brands, Inc., Parts and Accessories Diagram—Model HBH850 (Production Release), Feb. 12, 2015, pp. 1-4.

Hamilton Beach Brands, Inc., Parts and Accessories Diagram—Model HBH850 (Production Release), Feb. 18, 2016, pp. 1-4.

Hamilton Beach Brands, Inc., Parts and Accessories Diagram—Model HBH850 (Production Release), Mar. 23, 2015, pp. 1-4.

Hamilton Beach Brands, Inc., Parts and Accessories Diagram—Model HBH850 (Replace Upper Housing part No. and add Quiet Shield absorbers, DOC540090700), Jan. 31, 2017, pp. 1-4.

Hamilton Beach Brands, Inc., Parts and Accessories Diagram—Model HBH850 (Replace Upper Housing part No. and add Quiet Shield absorbers, DOC540087101), Jan. 31, 2017, pp. 1-4.

Hamilton Beach Brands, Inc., Parts and Accessories Diagram—Model HBH850 (Replace Upper Housing part No. and add Quiet Shield absorbers, DOC540087100), Jan. 31, 2017, pp. 1-4.

Hamilton Beach Brands, Inc., Parts and Accessories Diagram—Model HBH850 (Update VFD Board w/Touch Pad part No., DOC540087100), Oct. 11, 2016, pp. 1-4.

Hamilton Beach Brands, Inc., Parts and Accessories Diagram—Model HBH850 (Update VFD Board w/Touch Pad per No., DOC540087101), Oct. 11, 2016, pp. 1-4.

Santos, Santos Downloads Webpage—General Catalogue, Brushless Blender 62 (Web Archive Capture), Jan. 25, 2015, pp. 1-2.

Hamilton Beach Brands, Inc., Parts and Accessories Diagram - Model HBH850-AU (Update Switch, DOC540087200), Feb. 2, 2017, pp. 1-4.

Hamilton Beach Brands, Inc., Parts and Accessories Diagram—Model HBH850-BZ220, (Update VFD Board w/Touch Pad part No. DOC540087300), Oct. 11, 2016, pp. 1-5.

Hamilton Beach Brands, Inc., Parts and Accessories Diagram—Model HBH850-CE (Update Switch, DOC510030830), Feb. 2, 2017, pp. 1-4.

Hamilton Beach Brands, Inc., Parts and Accessories Diagram—Model HBH850-CE, Added new shock absorbers, Dec. 3, 2014, pp. 1-4.

Hamilton Beach Brands, Inc., Replacement Parts and Accessories Diagram—Model HBH850-SA (Update Lid and Container Complete part numbers), Jul. 27, 2016, pp. 1-3.

Hamilton Beach Brands, Inc., Replacement Parts Diagram—HBH850 Series K (Added Hall Effect Sensor and part number), Apr. 28, 2010, pp. 1-2.

Hamilton Beach Brands, Inc., Replacement Parts Diagram—HBH850 Series K (Production Release), Mar. 1, 2010, pp. 1.

Hamilton Beach Brands, Inc., Replacement Parts Diagram—HBH850 Series K (Removed Hall Effect Sensor and part number), Dec. 8, 2010, pp. 1.

Hamilton Beach Brands, Inc., Specification—HBH850 Series L (Text Justification), Jul. 28, 2013, pp. 1-9.

Hamilton Beach Brands, Inc., Technical Data Sheet—HBH850 (Add Jumper Pin extensions, p. 10), Jan. 5, 2017, pp. 1-13.

Hamilton Beach Brands, Inc., Parts and Accessories Diagram—Model HBH850-CE (Update Upper Housing, DOC510024900), Feb. 2, 2017, pp. 1-4.

Hamilton Beach Brands, Inc., Technical Data Sheet—HBH850 Series L (Production Release), Jul. 23, 2012, pp. 1-8.

Hamilton Beach Brands, Inc., Wiring Diagram—GB25(120V) (Production Release), Jan. 28, 2013, pp. 1.

(56) References Cited

OTHER PUBLICATIONS

Hamilton Beach Brands, Inc., Wiring Diagram—Model HBH850 (Production Release), May 21, 2008, pp. 1.
Hamilton Beach Commercial Website—The Summit Blender HBH850 (Wayback Machine Web Archive Capture), https://web.archive.org/web/20141026100334/http:/commercial.hamiltonbeach.com/foodserviceusa/high-performance-blenders-summit-high-performance-blender.with-auto-blend-hbh850.html, Dec. 10, 2015.
Santos, Santos Model 62 Exploded View, (Internet Archive Capture), https://web.archive.org/web/20160912180738/ http://www.santos.fr/media/ftp/Exploded_views/ 62/SANTOS_62_view_131103.tif, Sep. 12, 2016, pp. 1-3.
Hamilton Beach Brands, Inc., Wiring Schematic—G5CE Commercial Blender (Update wiring diagram for illuminating circuit breaker), Apr. 11, 17, pp. 1.
Santos, Santos Brushless Blender #62 Product Leaflet, https://web.archive.org/web/20150714210823/http:// www.santos.fr/media/ftp/sales leaflets/EN english/ SANTOS 62 leaflet EN.pdf, Jul. 14, 2015, pp. 1-3.
Hamilton Beach Brands, Inc, Technical Data Sheet—HBH850 Series M+, Aug. 14, 2013, pp. 1-9.
Hamilton Beach Brands, Replacement Parts Diagram—Model HBH850-CE (Series A-H), Changed Lower housing part No., May 11, 2011, pp. 1-3.
Hamilton Beach Brands, Specification HBH850-230V Blender Technical Information Series A-N, Production Release, Jul. 30, 2013, pp. 1-11.
Hamilton Beach Brands, Technical Data Sheet, HBH850-CE Summit Blender Technical Information Trouble Shooting Guide, https://partsapp.hamiltonbeach.com/files/520004200A.pdf, Jul. 13, 2009 pp. 1-9.
Hamilton Beach Commercial Website—HBH850 Summit High-Performance Blender (Wayback Machine Web Archive Capture), https://web.archive.org/web/20141026100334/http:/commercial.hamiltonbeach.com/foodserviceusa/high•performance-blenders-summit-high-performance-blender.with-auto-blend-hbh850.html, Oct. 26, 2014.
Santos, Santos Model 62 Exploded View—SANTOS_62_view_120202.tif (Internet Archive Capture), https://web.archive.org/web/20160912175710/http:/www.santos.fr/media/ftp/Exploded_ views/62/SANTOS_62_ view_120202.tif, Sep. 12, 2016, pp. 1-3.
KaTom Product Listing—Hamilton Beach HBH850 Bar Blender (Wayback Machine Web Archive Capture), https://web.archive.org/web/20150908070841/https://www.katom.com/041-HBH850.html, Sep. 8, 2015.
Omcan, Santos 62 Brushless Blender (YouTube Video, Web Archive Capture), https://www.youtube.com/watch? v=KDqzKGLJ58s, Dec 17, 2025, pp. 1-2.
Santos, Santos Model 62 Exploded View, (Internet Archive Capture), https://web.archive.org/web/20160912175919/ http:/www.santos.frlmedia/ftp/Exploded_ views/62/SANTOS_62_view_100401.tif, Sep. 12, 2016.
Santos, Santos Model 62 Exploded View—SANTOS_62_view_140104.tif, (Internet Archive Capture), https://web.archive.org/web/20160912173933/http:/ www.santos.fr I media/ftp/Exploded_ views/62/ SANTOS_62_view_140104. tif, Sep. 12, 2016, pp. 1-3.
Santos Brushless Blender 62—EN (YouTube Video, Web Archive Capture), https://www.youtube.com/watch ? v=0SxNIoONjW8, Dec 17, 2025, pp. 1-3.
Santos SAS, Brushless Blender #62 Recipe Maker and Firmware Update, https://web.archive.org/web/20160404232217/http:/www.brushlessblender.com/, Apr. 4, 2016, pp. 1-2.
Santos SAS, Santos Brushless Blender N°62 User and Maintenance Manual, Wayback Machine Web Archive, https://web.archive.org/web/20160912175414/https://www.santos.fr/media/ftp/Users_manuals/EN_ English/SANTOS_62-manu-EN-last.pdf, Sep. 12, 2016, pp. 1-26.
Santos USA—Miracle Exclusives, Santos USA Brushless Blender #62 Product Specification and Marketing Leaflet, Nov. 2015, pp. 1-4.

* cited by examiner

AUXILIARY COOLING FAN FOR A BLENDING SYSTEM

CROSS-REFERENCE TO RELATED APPLICATIONS

This application is a continuation of Ser. No. 17/019,682 entitled "AUXILIARY COOLING FAN FOR A BLENDING SYSTEM," filed on Sep. 14, 2020, which is a continuation of Ser. No. 15/486,344 entitled "AUXILIARY COOLING FAN FOR A BLENDING SYSTEM," filed on Apr. 13, 2017 which claims priority to U.S. Provisional Patent Application No. 62/321,925 entitled "AUXILIARY COOLING FAN FORA BLENDING SYSTEM," filed on Apr. 13, 2016, each of which is incorporated herein by reference in its entirety.

TECHNICAL FIELD

The present teachings relate to a cooling system for a blender, and more particularly, to an auxiliary cooling fan for a blender system utilizing a fan that is controlled independent of a blade assembly.

BACKGROUND

Blender systems are often used to blend and process foodstuffs. Conventional blenders generally include a blender base with a motor, a mixing container with an operable mixing blade disposed therein. Blenders often include a fan that is driven by a motor. The motor additionally drives a blade disposed within a container. An example of such a system is described in U.S. Pat. No. 5,273,358 A.

These blender systems are often used to blend and process foodstuffs. Frozen, frosty, or icy drinks have become increasingly popular. Such drinks include the traditional shakes, and the more recently popular smoothies. Shakes, or milk shakes, are typically formed of ice-cream and/or milk, and flavored as desired, with or without additives, such as candies, chocolates, peanut butter, fruits, etc. Milkshakes typically are available at most fast-food restaurants, such as burger chains, and may be made by special machines, or hand-made using mixers.

Smoothies tend to be healthier, and are formed of ice, frozen yogurt, and/or sorbet, and also may include additives such as fruits, fruit juice, vitamins, supplements, etc. Smoothies typically are available from specialty chains or juice bars, and may be made with commercial or restaurant-grade blender. Such drinks also may be made at home, using a standard personal blender. One disadvantage with making such drinks, or utilizing blenders, is the difficulty in operating the blender due to the specific ingredients required in some recipes. Blenders may get clogged or otherwise stalled by the drink ingredients. One possible cause of stalling is overheating of the motor or other portions of the blender. For instance, some blenders have a thermal shut-off that turns off a motor and blending mechanism when there is temperature build up in the blander base. This prevents damage to the blender. A user cannot use the blender again until the temperature decreases.

In an example, a blender may have different settings for different programs. A milkshake setting may be slower than a soup setting or the like. Thus, when a slower setting is chosen, the motor operates the fan and the blade assembly at the slower speed. The slower speed may mean that less cooling air is drawn through the blender.

Therefore, a need exists for improved blender systems, improved cooling of blender systems, and the like.

SUMMARY

A blender system may include a blender base and a container that is operably engaged with the blender base. The blender may include a motor that operatively engages a blade assembly disposed within the container. The motor may also operatively engage and drive a primary fan. An auxiliary fan may also be comprised by the blender base. The blender base may operate the auxiliary fan at speeds that vary with respect to the speed of the blade assembly or primary fan.

In another aspect, a blender system may include a blender base and a container, a motor that operatively engages a blade assembly disposed within the container, and an auxiliary fan. The auxiliary fan may be driven at speeds that are different from the rotational speed of the blade assembly. The auxiliary fan may be driven at times when the motor is not running.

A method for operating a blender system is described herein. The method may include providing a blender base with a motor that operatively drives a mixing blade, and a container engaged with the blender base. The method may further include operating a fan at a speed that is different from the speed for the motor.

DESCRIPTION OF THE DRAWINGS

The present teachings may be better understood by reference to the following detailed description taken in connection with the following illustrations, wherein.

DETAILED DESCRIPTION

Figure 1A:
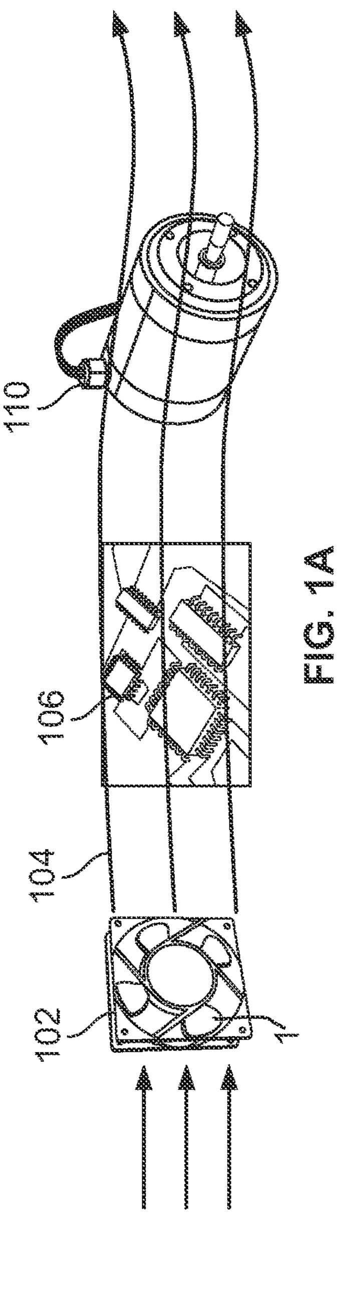
FIG. 1A is a blending system including a fan that may push air towards a circuit board and a motor in accordance with various disclosed aspects.

Reference will now be made in detail to embodiments of the present teachings, examples of which are illustrated in the accompanying drawings. It is to be understood that other embodiments may be utilized and structural and functional changes may be made without departing from the respective scope of the present teachings. Moreover, features of the various embodiments may be combined or altered without departing from the scope of the present teachings, e.g., features of each embodiment disclosed herein may be combined or replaced with features of the other embodiments disclosed herein. As such, the following description is presented by way of illustration only and should not limit in any way the various alternatives and modifications that may be made to the illustrated embodiments and still be within the spirit and scope of the present teachings.

"Logic" refers to any information and/or data that may be applied to direct the operation of a processor. Logic may be formed from instruction signals stored in a memory (e.g., a non-transitory memory). Software is one example of logic. In another aspect, logic may include hardware, alone or in combination with software. For instance, logic may include digital and/or analog hardware circuits, such as hardware circuits comprising logical gates (e.g., AND, OR, XOR, NAND, NOR, and other logical operations). Furthermore, logic may be programmed and/or include aspects of various devices and is not limited to a single device.

It is noted that the various embodiments described herein may include other components and/or functionality. It is further noted that while described embodiments refer to a blender or a blender system, various other systems may be utilized in view of the described embodiments. For example, embodiments may be utilized in food processor systems, mixing systems, hand-held blender systems, various other food preparation systems, and the like. As such, references to a blender, blender system, and the like, are understood to include food processor systems, and other mixing systems. Such systems generally include a blender base that may include a motor, a blade assembly, and a controller. Further, such systems may include a container, a display, a memory or a processor. A blade assembly, a blending container, and a blender base may removably or irremovably attach. The blending container may be powered in any appropriate manner, such as disclosed in U.S. patent application Ser. No. 14/213,557, entitled Powered Blending Container, which is hereby incorporated by reference.

Foodstuff may be added to the blending container. Furthermore, while blending of "ingredients," "contents" or "foodstuffs" is described by various embodiments, it is noted that non-foodstuff may be mixed or blended, such as paints, epoxies, construction material (e.g., mortar, cement, etc.), and the like. Further, the blender systems may include any household blender and/or any type of commercial blender system, including those with covers that may encapsulate or partially encapsulate the blender. Commercial blender systems may include an overall blender system, such as a modular blender system that may include the blender along with other components, such as a cleaner, foodstuff storage device (including a refrigerator), an ice maker and/or dispenser, a foodstuff dispenser (a liquid or powder flavoring dispenser) or any other combination of such.

As used herein, the phrases "blending process," "blending program," and the like are used interchangeably unless context suggest otherwise or warrants a particular distinction among such terms. A blending process may comprise a series or sequence of blender settings and operations to be carried out by the blending device. In an aspect, a blending process may comprise at least one motor speed and at least one time interval for the given motor speed. For example, a blending process may comprise a series of blender motor speeds to operate the blender blade at the given speed, a series of time intervals corresponding to the given motor speeds, and other blender parameters and timing settings. The blending process may further include a ramp up speed that defines the amount of time the motor takes to reach its predetermined motor speed. The blending process may be stored on a memory and recalled by or communicated to the blending device.

Moreover, blending of foodstuff or ingredients may result in a blended product. Such blended products may include drinks, frozen drinks, smoothies, shakes, soups, purees, sorbets, butter (nut), dips or the like. It is noted that various other blended products may result from blending ingredients. Accordingly, terms such as "blended product" or "drink" may be used interchangeably unless context suggests otherwise or warrants a particular distinction among such terms. Further, such terms are not intended to limit possible blended products and should be viewed as examples of possible blended products.

It is noted that the term "fan" may refer to fan blades, a motor, a rotating shaft, and/or a combination thereof, as context may suggest. For instance, a blender fan may refer to the motor (which may drive a fan and a blade assembly), a shaft, and fan blades attached to the shaft. For instance, the phrase "a fan attached to the shaft of a motor," may utilize the term fan as referring to the fan blades. In another aspect, an auxiliary fan may refer to one or more fan blades, motor, and a shaft operatively driving the fan blades. As such, it is noted that the use of the term "fan" may depend on the context of the use. It is further noted that while examples may refer to a fan with reference to the blades, embodiments may utilize bladeless fans Some traditional blender systems include a motor that may run at many varying speeds. In these blender systems, the fan blades are attached integrally to the motor that controls the mixing or chopping blades. For instance, the fan blades may be affixed to a shaft of the motor or to an outer rotor. When the blades are attached directly to the motor, the rotational speed of the fan and, similarly, the amount of air drawn through the motor are directly related to the speed of the motor. Users often adjust the speed of the motor to control the mixing blades. This, however, also adjusts the speed of the fan.

When the motors are at a low speed and high load, this can create a disadvantage for cooling and conversely overheating the motor, for example. Overheating (e.g., of the motor) can occur in this condition, and may occur in a relatively short amount of time. For instance, a user may operate a blender at a low speed while mixing a thick or thickening smoothie. The thickness of the smoothie may put a high load on the motor, while the fan is operating at a low speed. Systems and methods described herein may allow for operation of fan blades independent (e.g., at different speeds) of the motor and the mixing blades. Thus, the fan blades may operate at a high speed while the motor and mixing blades operate at a low speed.

In embodiments disclosed herein, a blender may include a thermal shut-off that may turn off a motor and blending mechanism when an internal temperature exceeds a threshold temperature. This may prevent damage of the motor or other operative components of the blender, Described embodiments nay operate fan blades independent of the motor to dissipate heat at an increased rate relative blenders that do not operate fan blades independent of the motor. In another aspect, activation of the thermal shut-off may trigger activation of the fan blades.

In another example, such as in commercial settings, blenders may be used for many different sessions, where each session may be under a minute. The time between these sessions may range from seconds to minutes. During the down time, or time between sessions, the fan is not operating because the motor is not operating. This may limit the cooling abilities of the blender system. Described embodiments may allow for operation of the fans so that they may cool the motor in these down times or off cycles. Such can prevent heat from building up in the blender (e.g., the motor) causing failure, stalling, or the like. Described embodiments may cool various portions of a blender system, such as a motor, housing, electronics (e.g., circuit boards, wiring, microprocessor, memory devices, communication components such Wi-Fi, NFC, or other communication systems) or the like. It is noted that examples may describe cooling of a particular part(s) for purposes of illustration. Embodiments, however, may utilize a fan to cool various other parts.

Figure 1B:
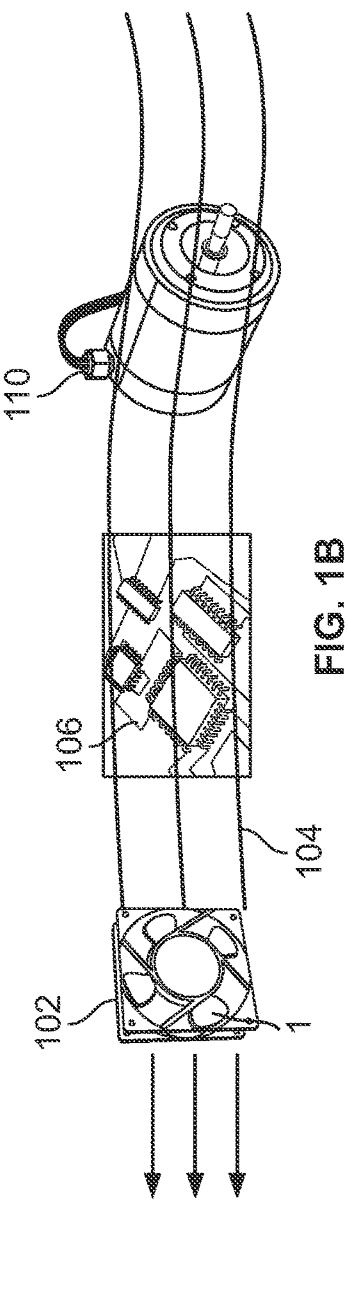
FIG. 1B is a blending system including a fan that may pull air towards a circuit board and a motor in accordance with various disclosed aspects.
Figure 1C:
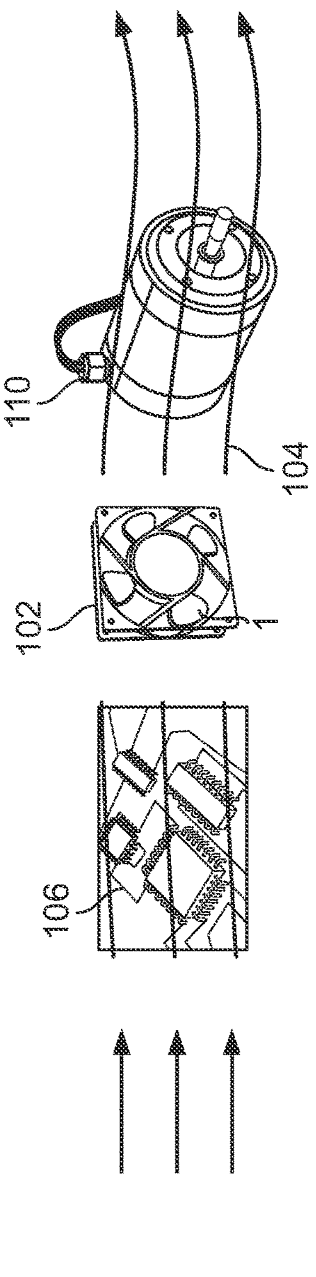
FIG. 1C is a blending system including a fan that may pull air towards a circuit board and may push air towards a motor in accordance with various disclosed aspects.

Turning to FIGS. 1A, 1B, and 1C, there are exemplary diagrams of an auxiliary fan 102 that operatively forces air through a blender system to cool a blending system that may include at least one of a circuit board 106 or a motor 110. The fan 102 may either pull or push air 104 through a blender airflow system as described in more detail herein. In an example, the orientation and positioning of the fan 102 may determine whether the fan 102 pushes or pulls the air 104 through a blender airflow system.

As an exemplary embodiment, FIG. 1A illustrates the fan 102 disposed proximal air inlet 112. The air inlet 112 may comprise a vent or opening in a blender base (as described herein). When the fan 102 is rotating its blades 1, the blades 1 will force or pull cool air from the air inlet 112 and at least one of force the: air across of the circuit board 106; onto heat sinks (not shown); around a shell/housing of the motor 110; through the motor 110 (e.g., between the rotor and stator internal to the motor 110); or the like.

FIG. 1B illustrates the fan 102 disposed proximal air outlet or exit 114. The air exit 114 may comprise an exhaust, vent or opening in a blender base (as described herein). When the fan 102 is rotating its blades 1, the blades 1 will force or pull warm air from the air inlet 112 and at least one of: force the air across of the circuit board 106; force the air onto heat sinks (not shown); force the air around a shell/housing of the motor 110; force the air through the motor 110 (e.g., between the rotor and stator internal to the motor 110); or the like.

It is noted that the fan 102 may be disposed between the circuit board 106 and the motor 110, as shown in FIG. 1C. Moreover, while FIG. 1C shows fan 102 pulling air 104 across the circuit board 106, and pushing the air 104 around or through the motor 110, it is noted that the fan 102 may pull air 104 across, around, or through the motor 110 and push the air 104 across the circuit board 106.

In another aspect, the fan 102 may operate independently of the motor 110. For instance, the fan 102 may operate at a different speed than the motor 110, including when the motor 110 is at a speed of zero (e.g., the motor is off or not rotating). Moreover, blending systems described herein may utilize various aspects as disclosed with reference to FIGS. 1A-1C.

According to various embodiments, a blending system may comprise other or different components such as a motor housing, a container, a mixing blade assembly, or the like. In at least one embodiment, the blender system may include a plurality of fans. In at least one embodiment, a blending system may not comprise a circuit board 106, may comprise a different motor 110, or the like. In another aspect, a blending system may or may not comprise a second fan that is driven by the motor 110. The fan 102 may be an auxiliary fan that may run when the motor is on or running, when the motor is off or not running, upon a triggering event (e.g., temperature reaches a threshold level), or the like. For instance, the fan 102 may not run while the motor and the primary fan are running at high speeds. This may prevent peak amperage draw conditions.

Figure 2:
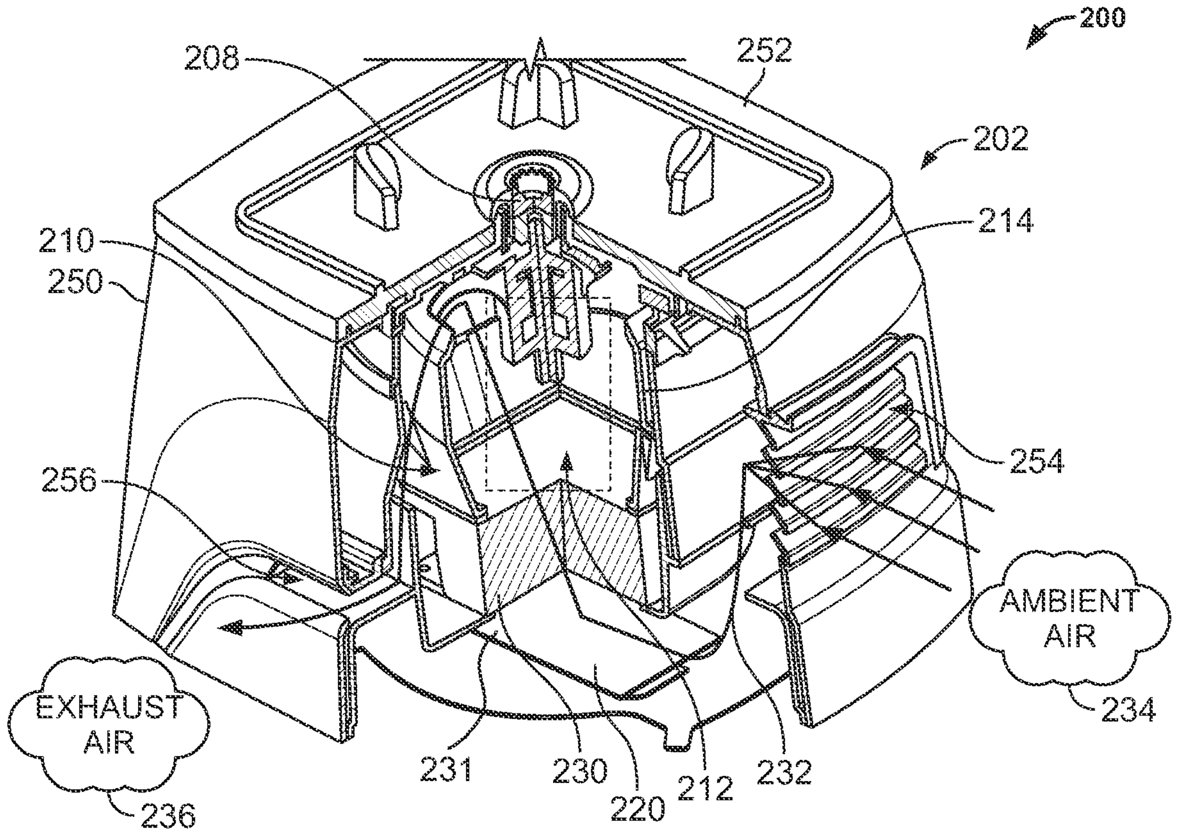
FIG. 2 is a prospective, partial and cross-sectional view of a blending system including one or more auxiliary fans in accordance with various disclosed aspects.

Referring now to FIG. 2, there is a blending system 200 comprising an auxiliary fan operable independent of a motor. The blending system 200 may include a blender base 202. It is noted that the blender base 202 may operatively engage with a container and blade assembly as described herein.

As illustrated, the blender base 202 may primarily comprise a shell or housing 250 that may house operative components of the blender base 202. The housing 250 may comprise a monolithically formed component (e.g., a single, unitary piece) or disparately formed components (e.g., multiple pieces removably or irremovably attached). It is noted that the housing 250 may be constructed of various materials, such as plastic, metal, glass, rubber, and the like.

Figure 4:
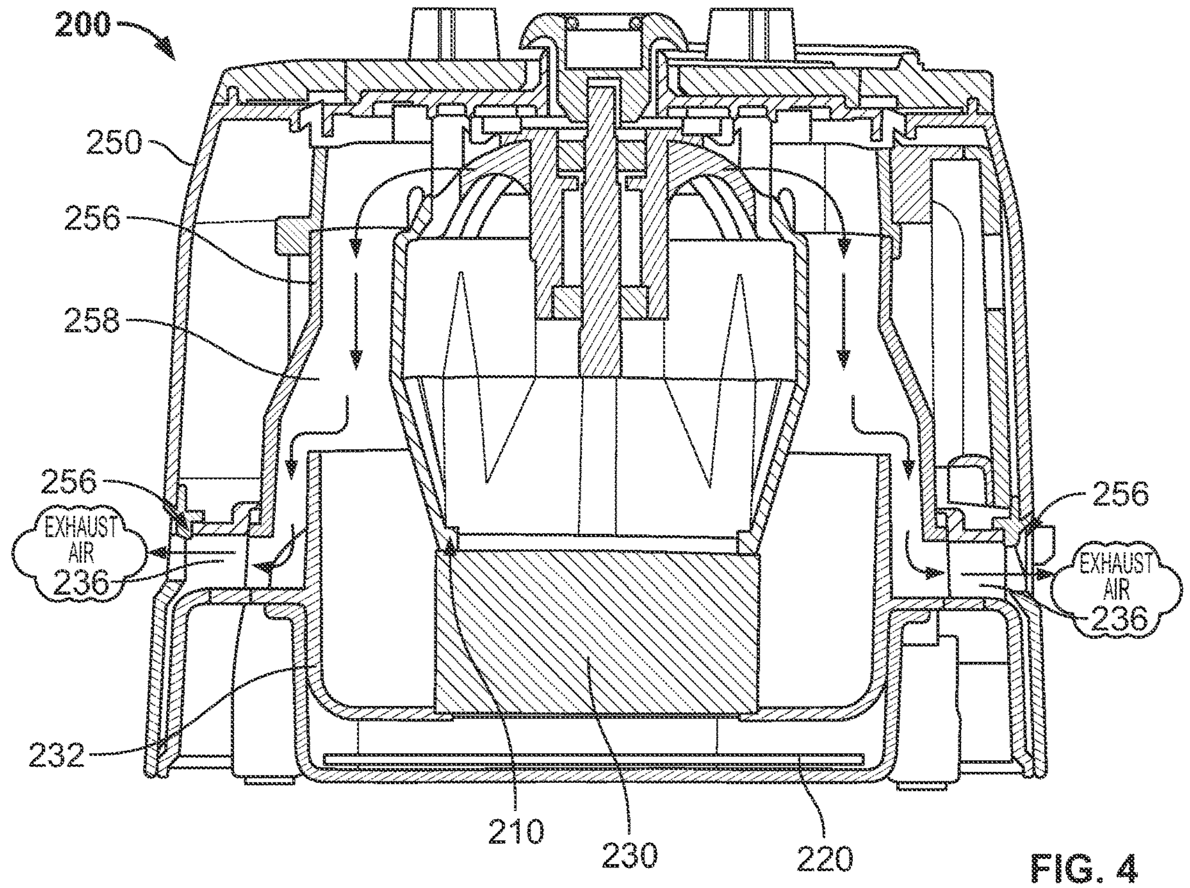
FIG. 4 is a back, cross-sectional view of the blending system of FIG. 2 in accordance with various disclosed aspects.

The housing 250 may include at least one air inlet 254 and at least one air outlet or exhaust 256. It is noted housing 250 may comprise any number of air inlets and/or exhausts disposed in any number of locations. While air inlet 254 is illustrated on a side of housing 250, it is noted that an air inlet may be disposed on a top or bottom of the housing 250. In another aspect, the air inlet 254 may comprise a vent, and may be disposed to generally prevent intake of foodstuff that may spill from a container or from user operation of the blending system 200. Moreover, while housing 250 is depicted with two exhausts 256—as shown in FIG. 4—disposed on opposed sides of the blender base 202, it is noted that housing 250 may include other or different exhausts. For instance, the housing 250 may include at least one exhaust disposed on a top, bottom, corner, or other position of blender base 202.

In embodiments, the blender base 202 may include or be coupled with a pedestal 252, which may allow a blender container (not shown) to dock or mate with the blender base 202. A blade coupler, such as splined coupler 208, may be driven by a motor 210. Motor 210 may comprise a stepper motor, switched reluctance motor, brushless motor, shunt motor, copper-brush motor, universal motor, induction motor, or the like. It is noted that the motor 210 may be operatively powered by power mains, a battery, or another power source. In another aspect, the motor 210 may or may not be communicatively coupled to a circuit board 220. For instance, the circuit board 220 may control operation of the motor 210. The circuit board 220 may operatively receive input to control operation of the motor 210. The input may be input from a user interface (e.g., buttons, nobs, switches, etc.), a user device (e.g., cell phone, tablet, computer, wearable, etc.), one or more sensors (e.g., heat sensors, proximity sensors, etc.), an interlock system, or the like.

The circuit board 220 may comprise an integrated circuit having a memory, a processor, and other circuitry. A memory device or memory may store computer executable instructions and the processor may facilitate execution of the computer executable instructions. The processor may process instructions to control operations of the motor 210. For example, the instructions may facilitate execution of a particular blending process, such as a "soup," "frozen drink," or other process. It is further noted that the circuit board 220 may be coupled with a fan 230, and the instructions may control operations of the fan 230. While embodiments describe circuit board 220 coupled to and controlling the motor 210 and fan 230, it is noted that these components may comprise other or different controllers, circuit boards, memory, and/or processors. For instance, fan 230 may comprise a processor 231 that controls operation of the fan 230 independent of operation of the motor 210. However, at least for brevity, embodiments are described wherein circuit board 220 controls operations of the motor 210 and fan 230.

It is noted that the fan 230 may be operatively powered by power mains, a battery, or another power source. In at least one embodiment, blending system 200 may include a power source (not shown) that operates the fan 230 and a different power source that operates the motor 210. This may allow the blending system 200 to operate the fan 230 when the power source of the motor 210 is not connected or otherwise supplied.

In embodiments, fan 230 may be disposed in air flow path 232 to allow air from air inlet 254 to be forced across and/or through the circuit board 220 and motor 210. It is noted that the air flow path 232 may comprise a fluid passage that may be directed by geometric features of the blender base 202. For instance, walls, bevels, corners, or the like may direct air from the air inlet 254 to the one or more exhausts 256. As illustrated in FIG. 2, the fan 230 may be disposed between—relative to the air flow path 232—circuit board 220 and motor 210. In this configuration, the fan 230 may pull air from air inlet 254 over the circuit board 220. The fan 230 may then push the air through or about motor 210. Moreover, while fan 230 is depicted as forcing air through a bore 212 of the motor, it is noted that the air may be directed at heat sinks (not shown), about a motor housing 214, or the like.

The air flow path 232 may allow for cool (e.g., relative to the internal temperature of the air that would otherwise be present in the blender base arising from operation of the motor) or ambient air 234 to be pulled into the housing 250 by the fan 230. The ambient air 234 may be cooler than air within the housing 250. As the fan 230 forces the air through the air flow path 232, it may absorb heat and/or fluidly force already heated air (e.g., air near or in the motor 210) towards the exhaust 256. The heated air may then exit the exhaust 256 as shown by exhaust air 236.

According to at least one embodiment, disclosed systems may be well suited for various types of motors 210. For instance, embodiments may be suited for brushless motors. It is noted, however, that various disclosed embodiments may be applicable to other types of motors.

Figure 3:
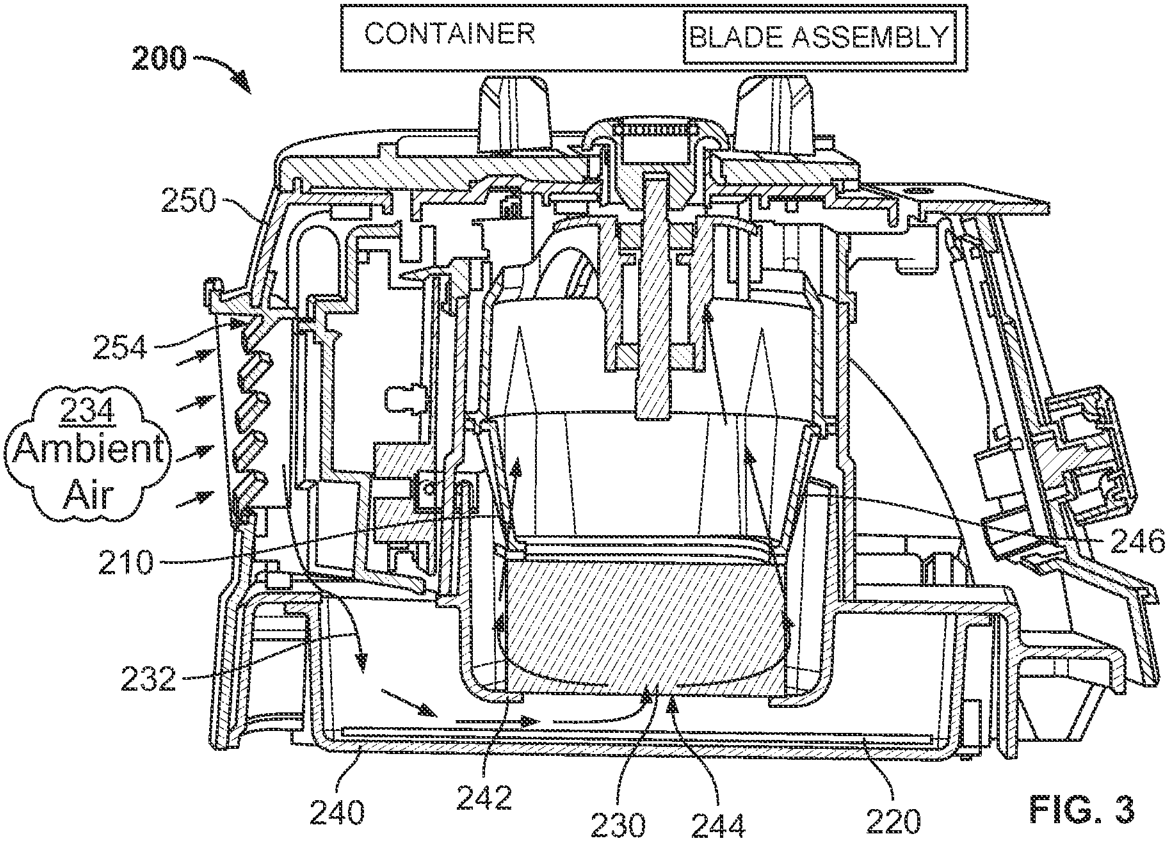
FIG. 3 is a side, cross-sectional view of the blending system of FIG. 2 in accordance with various disclosed aspects.

Turning to FIG. 3, with reference to FIG. 2, there is a partial, cross-sectional view of the blending system 200. As can be seen from this view, the ambient air 234 is drawn through the air inlet 254. The air follows the air flow path 232 through a lower chamber 240 and into an upper chamber 242. The upper chamber may house the fan 230. The fan 230 may force the air into motor housing 246 of motor 210.

As shown in FIG. 4, the air may be forced from motor housing 246 to an exhaust passage 258. The exhaust passage 258 may fluidly connect the motor housing 246 to the exhaust 256. While two exhausts 256 are illustrated, it is noted that the blending system 200 may comprise a different number of exhausts (e.g., 1, 3, 4, etc.). Moreover, the exhausts 256 may comprise vented apertures.

Figure 5:
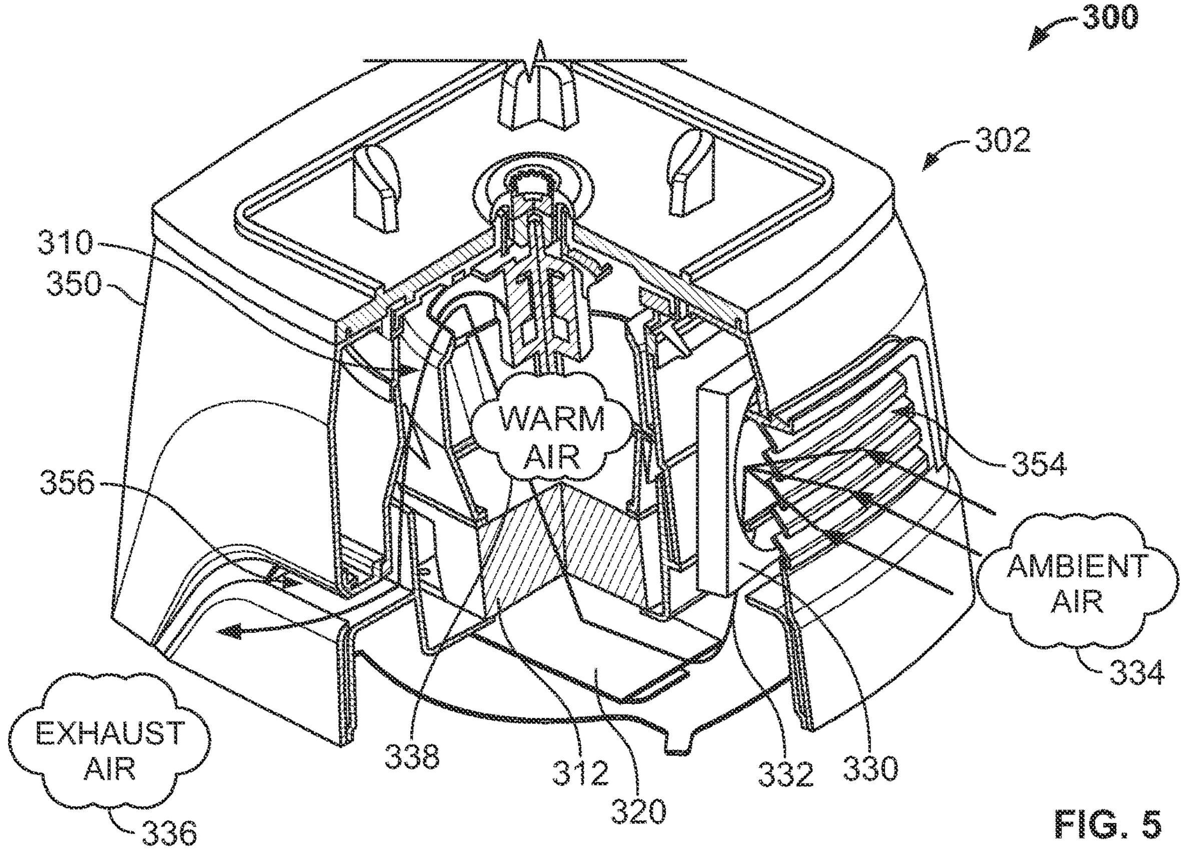
FIG. 5 is a prospective, partial and cross-sectional view of a blending system including an auxiliary fan and a motor fan in accordance with various disclosed aspects.

Referring now to FIG. 5, there is a blender base 302 of a blending system 300. It is noted that like-named components of FIG. 5 and those of the other figures may comprise similar aspects or functionality, unless context suggests otherwise or warrants a particular distinction among the terms. For instance, housing 350 may comprise similar aspects as housing 250. Likewise, motor 310 may comprise similar aspects as motor 210.

Blender base 302 may include an auxiliary fan 330 and a motor fan 312. In an example, the motor fan 312 may be driven by the motor 310, and the auxiliary fan 330 may be driven by a different motor. For instance, auxiliary fan 330 may comprise its own dedicated motor. In another aspect, auxiliary fan 330 may be coupled to and controlled by circuit board 320. The circuit board 320 may control various operations of the blending system 300 as described with reference to the various other figures. The operations may include control of motor 310 operations (which may operatively drive a blade assembly (not shown) and motor fan 312) and may control of auxiliary fan 330.

One or more of motor fan 312 or auxiliary fan(s) 330 may force ambient air 334 through air intake 354, over circuit board 320, and through or about motor 310 (e.g., as shown by air flow path 332). In another aspect, warmed air 338 may be forced to exit the exhaust 356 as exhaust air 336. It is noted that the warmed air 338 may be warmed by or otherwise absorb heat. The heat may be generated by the motor 310 or other operative components of the blender base 302.

In an example, a user may attach a container (not shown) to the blender base 302. The user may utilize controls to operate the blender base 302 and cause the motor 310 to rotate a blade assembly. In certain instances, the motor 310 may produce more heat than motor fan 312 could dissipate. For instance, if the user is blending a particularly thick drink or soup at low speeds, the motor fan 312 will also be operating at low speeds. The viscosity of the drink may also cause the motor 310 to be under strain, resulting in increased heat production. Auxiliary fan 330 may operate at speeds that vary with respect to the speed of motor 310. As such, the auxiliary fan 330 may operate at a higher speed than the motor fan 312. This may increase the air flow through the blender base 302. The increased air flow may dissipate heat, may prevent the motor from overheating, and/or may prevent tripping of a thermal coupler (not shown).

As another example, a commercial smoothie shop may need to produce many smoothies in succession. This may result in blending at intervals, and shutting the motor off in between blending processes. This type of blending may result in a buildup of heat in the blender base 302. The auxiliary fan 330 may alleviate this heat by operating when motor 310 is turned off or otherwise not operating.

In some systems, a motor may operate a low speed and a high load when blending (e.g., such as when blending a thick product) relative other blending operations (e.g., such as when blending thinner products). In traditional blending systems, this may result in build up of heat as these traditional systems use the motor to operate both the fans and the mixing blades. In one or more described embodiments, the fan 330 may be driven by a separate motor and may not be driven by the motor 310 that operates the mixing blades and/or another fan. This may allow the blending system 300 to operate the fan 330 when it is needed, regardless of whether the motor 310 is operating or the speed at which the motor 310 is operating.

In another aspect, the motor 310 or mixing blades may seize up or otherwise not rotate during a blending process, such as when food stuff prevents the mixing blades from rotating. The blending system 300 may identify such conditions (e.g., via a sensor) and may determine whether or how to operate the fan 330. For instance, the blending system 300 may determine to increase a speed of fan 330 and/or turn the fan 330 on. The blending system 300 may determine to reduce the speed of the fan 330 and/or turn the fan 330 off when the motor 310 or mixing blades resume mixing or rotating.

Figure 6:
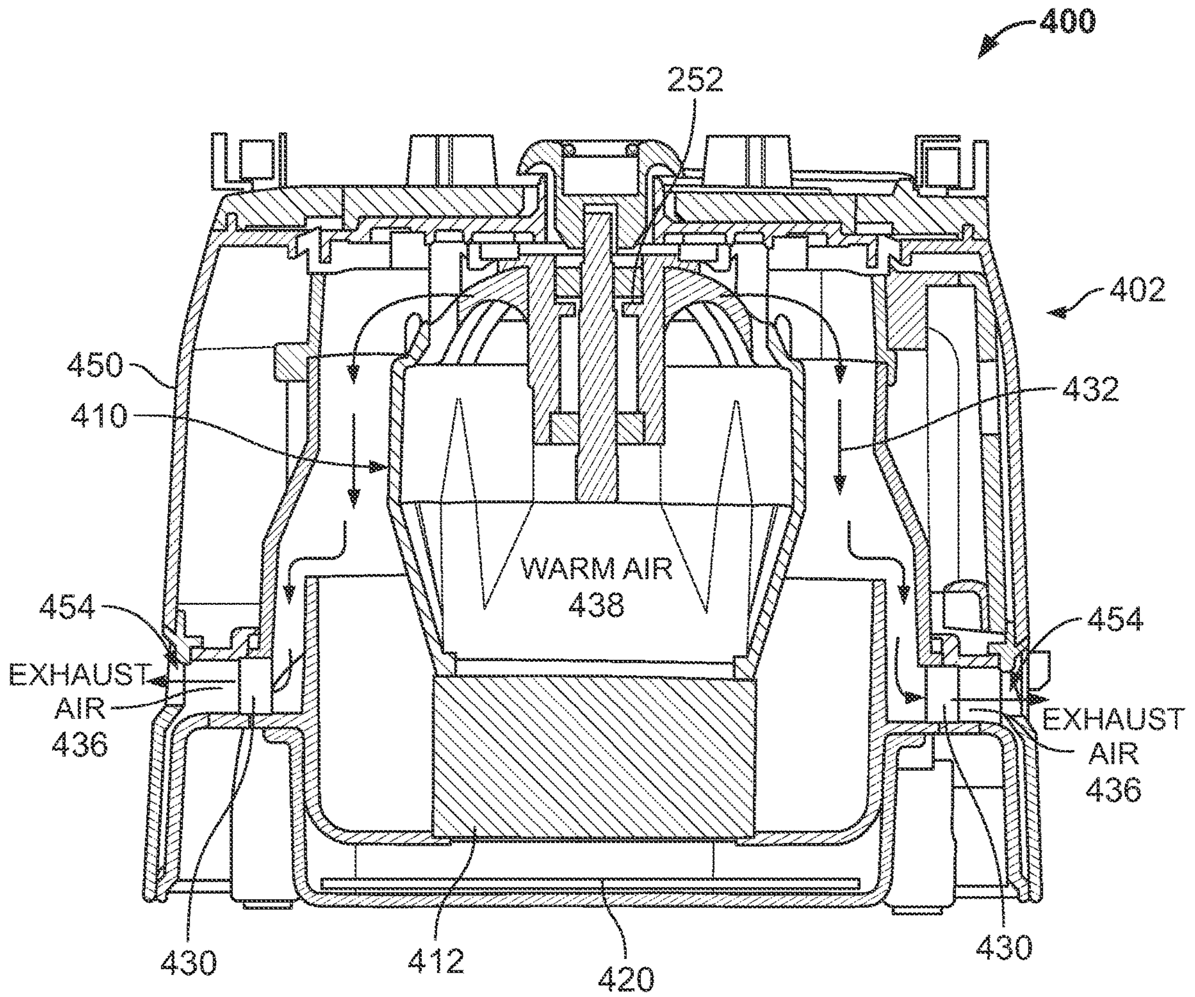
FIG. 6 is a prospective, partial and cross-sectional view of a blending system including a plurality of auxiliary fans and a motor fan in accordance with various disclosed aspects.

Referring now to FIG. 6, there is a blender base 402 of a blender system 400. It is noted that like-named components of FIG. 6 and those of the other figures may comprise similar aspects or functionality, unless context suggests otherwise or warrants a particular distinction among the terms. For instance, housing 450 may comprise similar aspects as housing 250/350. Likewise, motor 410 may comprise similar aspects as motor 210/310.

Blender base 402 may include an auxiliary fan 430 and a motor fan 412. In an example, the motor fan 412 may be driven by the motor 410, and the auxiliary fan 430 may be driven by a different motor. For instance, auxiliary fan 430 may comprise its own dedicated motor. In another aspect, auxiliary fan 430 may be coupled to and controlled by circuit board 420. The circuit board 420 may control various operations of the blender system 400 as described with reference to the various other figures. The operations may include control of motor 410 operations (which may operatively drive a blade assembly (not shown) and motor fan 412) and control of auxiliary fan 430.

One or more of motor fan 412 or auxiliary fans 430 may force ambient air 434 through an air intake (not shown), over circuit board 420, and through or about motor 410 (e.g., as shown by air flow path 432). In another aspect, warmed air 438 may be forced to exit the exhaust 456 as exhaust air 436. It is noted that the warmed air 438 may be warmed by or otherwise absorb heat. The heat may be generated by the motor 410 or other operative components of the blender base 402.

As shown, blender system 400 may include one or more auxiliary fans 430 disposed proximal one or more exhausts 454. The auxiliary fans 430 may pull warm air 438 from the blender base 402 and expel the air as exhaust air 436. It is noted that the one or more auxiliary fans may be controlled as described with reference to the various disclosed figures. It is further noted that the one or more auxiliary fans 430 may be disposed at other locations that allow the one or more auxiliary fans 430 to operatively force air to exit the one or more exhausts 454.

It is noted that the various disclosed fans (e.g., fan 102, 230, 330, 430, etc.) may have a single speed or variable speeds. Such fans may be controlled based on one or more control processes. For example, an auxiliary fan may be turned on at a desired speed based on one or more of: a temperature exceeding a threshold; a selected blending process; a duration of motor operation; a timer; manual control; current or power demand; or the like According to at least one embodiment, blender system 400 may include one or more sensors as disclosed herein. The one or more sensors may include, for example, a thermal or heat sensor that may detect or measure heat in the blender system 400. The sensors may be coupled to a one or more auxiliary fans 430 and/or a controller that operatively controls the one or more auxiliary fans 430. The one or more auxiliary fans 430 may operatively adjust speeds, turn on/off, or otherwise operate based on input from the sensors. In an example, the one or more sensors may be disposed at various locations. For instance, the blender system 400 may include a sensor disposed proximal motor 410 or in air flow path 432. The sensor may determine the temperature of the motor 410 and/or air in the blender base 402. A controller may receive input from the sensor and may determine whether to turn on/off the one or more auxiliary fans 430. For example, the controller may determine that the temperature is above a threshold and may control the one or more auxiliary fans 430 to force the exhaust air 436 out of the exhausts 454. It is noted that controller may determine a speed at with the one or more auxiliary fans 430 operates, determine whether to turn on/off the one or more auxiliary fans 430, or the like.

As described herein, the one or more auxiliary fans 430 may be controlled by other devices, such as a user interface (not shown). For example, a user interface may include knobs, buttons, touch screens, or the like that control operation of the motor 410. The user interface may include a control that allows a user to selectively control the one or more auxiliary fans 430. It is noted that the blender system 400 may override a user selection to control the one or more auxiliary fans 430. In an example, a user may interact with an interface to turn off the one or more auxiliary fans 430. If heat builds, the blender system 400 may operatively turn on the one or more auxiliary fans 430 to reduce or prevent heat buildup.

Disclosed embodiments may allow for more complex control systems compared to traditional blending systems. For instance, a controller may control parameters of the one or more auxiliary fans 430 according to need, rather than whenever the motor 410 is operating. In an example, a controller may select or determine when to turn on/off (or a speed at which to operate) the one or more auxiliary fans 430 based on a sensed temperature, select blending program, food contents within a blender container, user input, or the like.

In an aspect, a processor and memory (e.g., which may be comprised by circuit board 106, 220, 320, and/or 420) may utilize artificial intelligence, statistical models, or other processes and/or algorithms. In embodiments, the processor may utilize classifiers that map an attribute vector to a confidence that the attribute belongs to a class. For instance, the processor may input attribute vector, x=(x1, x2, x3, x4, xn) mapped to f(x)=confidence(class). Such classification can employ a probabilistic and/or statistical-based analysis (e.g., factoring into the analysis affinities and ingredient attributes) to infer optimal or preferred times and speeds at which to operate an auxiliary fan. In various embodiments, the processor may utilize other directed and undirected model classification approaches that include, e.g., naïve Bayes, Bayesian networks, decision trees, neural networks, fuzzy logic models, and probabilistic classification models providing different patterns of independence. Classification may also include statistical regression that is utilized to develop models of priority. Further still, classification may also include data derived from another system, such as cameras, optical scanning devices, optical scanners, spectrometer, multi-wave length scanner, electronic noses, or the like.

In accordance with various aspects of the subject specification, an example embodiment may employ classifiers that are explicitly trained (e.g., via a generic training data) as well as implicitly trained (e.g., via observing user behavior, blending information, user preferences, historical information, temperature data, current flow, receiving extrinsic information). For example, support vector machines may be configured via learning or training phase within a classifier constructor and feature selection module. Thus, the classifier(s) may be used to automatically learn and perform a number of functions, including but not limited to determining whether to, when, and at what speeds to operate the auxiliary fan, i.e., based solely on a single blender, or may apply across a set of the blenders. Information from the blenders may be aggregated and the classifier(s) may be used to automatically learn and perform a number of functions based on this aggregated information. The information may be dynamically distributed, such as through an automatic update, a notification, or any other method or means, to the entire user base, a subset thereof or to an individual blender. It is noted that other devices may receive information and may program the blender to control a fan based on a desired result.

Figure 7:
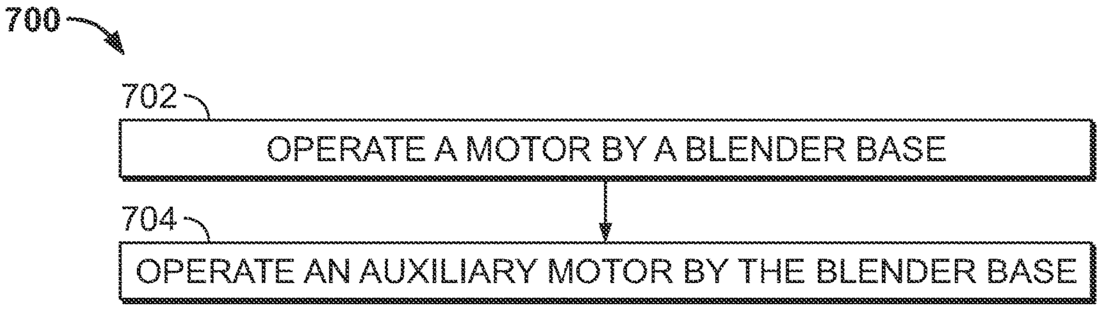
FIG. 7 is a method of operating a blender system in accordance with various disclosed embodiments.

In view of the subject matter described herein, a method that may be related to various embodiments may be better appreciated with reference to the flowchart of FIG. 7. While method 700 is shown and described as a series of blocks, it is noted that associated method or process is not limited by the order of the blocks. It is further noted that some blocks and corresponding actions may occur in different orders or concurrently with other blocks. Moreover, different blocks or actions may be utilized to implement the methods described hereinafter. Various actions may be completed by one or more of users, mechanical machines, automated assembly machines (e.g., including one or more processors or computing devices), or the likes.

FIG. 7 depicts an exemplary flowchart of non-limiting method 700 for managing heat in a blender system such as described herein. At 702, a blender base may operate a motor. The motor may operate a motor fan. It is noted that the blender base may or may not include a motor fan. It is further noted that the blender base may operate other components of a blender system.

At 704, the blender base may operate an auxiliary fan at the same or a different speed than the motor. For instance, the auxiliary fan may operate at a higher speed than the motor and/or than the motor fan. In another aspect, the auxiliary fan may operate when the motor is not running or is turned off.

In embodiments, to operate the auxiliary fan the blender base (e.g., via a memory, processor, or the like) may determine an operating parameter for the auxiliary fan based on user input or sensed input. For example, the blender base may determine a speed at which to operate the auxiliary fan or a time to start/stop the fan based on one or more of a temperature of the motor, a blending program, a speed of the motor, or the like. In an example, the blender base may determine at least one of a temperature of a component of the blender base (e.g., via one or more sensors), a speed of the motor (e.g., via one or more sensors), a blending program, or the like. As described herein, the blender base may operate the auxiliary fan during particular blending programs, upon determining heat within the blender base exceeds a threshold, a motor speed exceeds a threshold (e.g., including a maximum or a minimum threshold), or the like. It is noted that the thresholds for activating or otherwise operating the auxiliary fan may be different from the threshold of a thermal shut-off (e.g., thermal coupler, thermal fuse, etc.). For instance, the threshold temperature for operating the auxiliary fan may be lower than threshold temperature for triggering the thermal shut-off. This may allow the blender base to cool before the thermal shut-off is triggered. In some embodiments, this may prevent or delay triggering the thermal shut-off.

In another example, the blending system may receive input regarding the contents within a blending container and may determine operating parameters for a fan based at least in part on the contents. The blending system may receive the input from a user (e.g., via an interface of the blending system or a separate user device), a wireless identification tag on a food package, a selected program, optical sensors (e.g., optical recognition of food stuff), thermal sensors (e.g., which may identify a temperature of foodstuff), ultra-sonic sensors, or the like. According to various embodiments, the blending system may determine whether and how to operate the fan (e.g., when to turn on/off, operate at a selected speed, etc.) based on the contents of within the blending container.

As described herein, the disclosed blending systems may determine to turn off or reduce the speed of an auxiliary fan based on a triggering event or a preprogrammed process. For instance, blending systems may turn a fan on when heat exceeds a threshold, when a motor or mixing blade stops rotating, or as otherwise described herein. The blending system may monitor operating parameters to determine that heat is dissipated below a threshold, the motor or mixing blade begin rotating, power consumption reaches a threshold, or the like. Based on the monitored operating parameters, the blending system may turn off the fan to reduce power consumption, reduce noise, or otherwise increase efficiency of the blending system.

Figure 8:
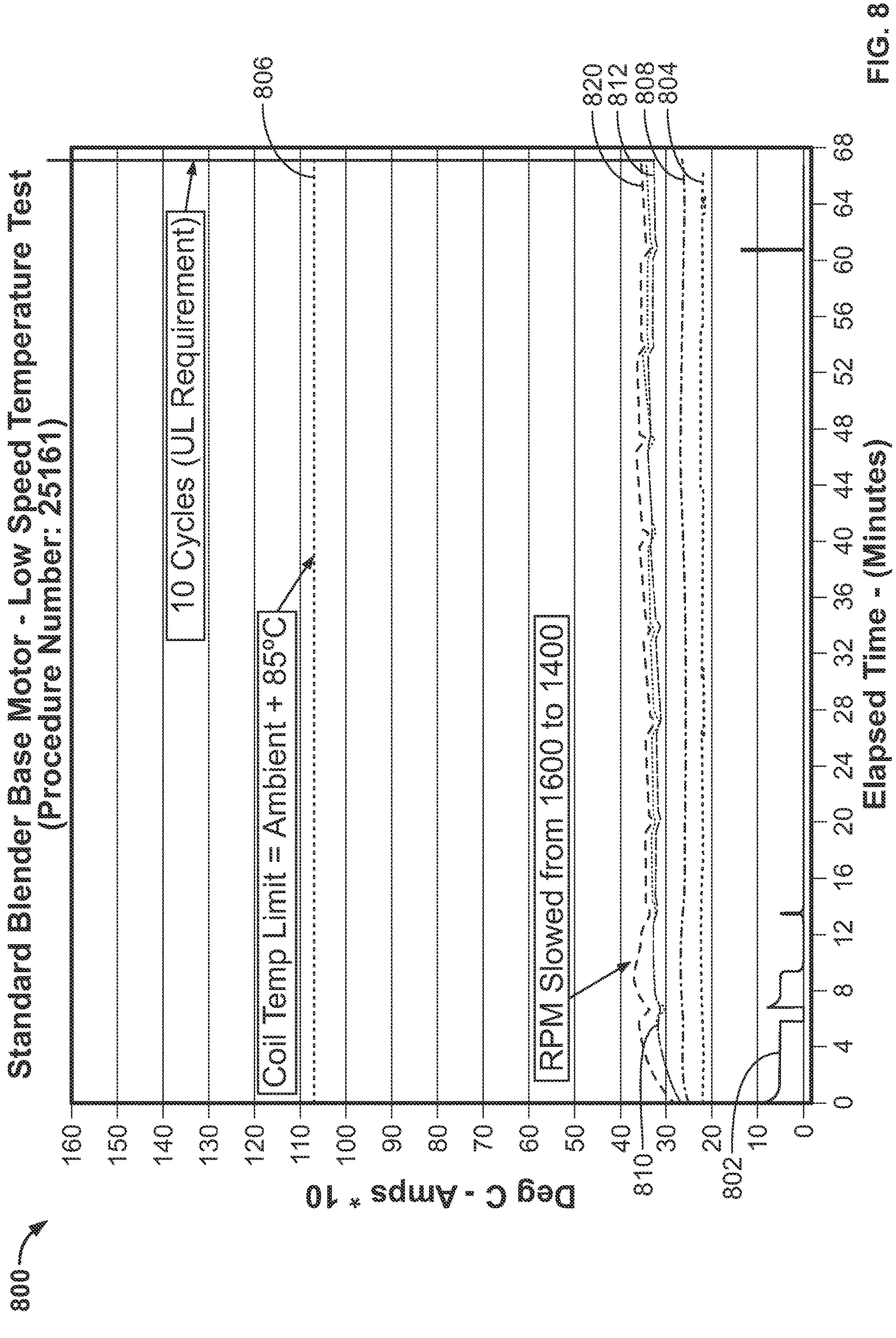
Figure 9:
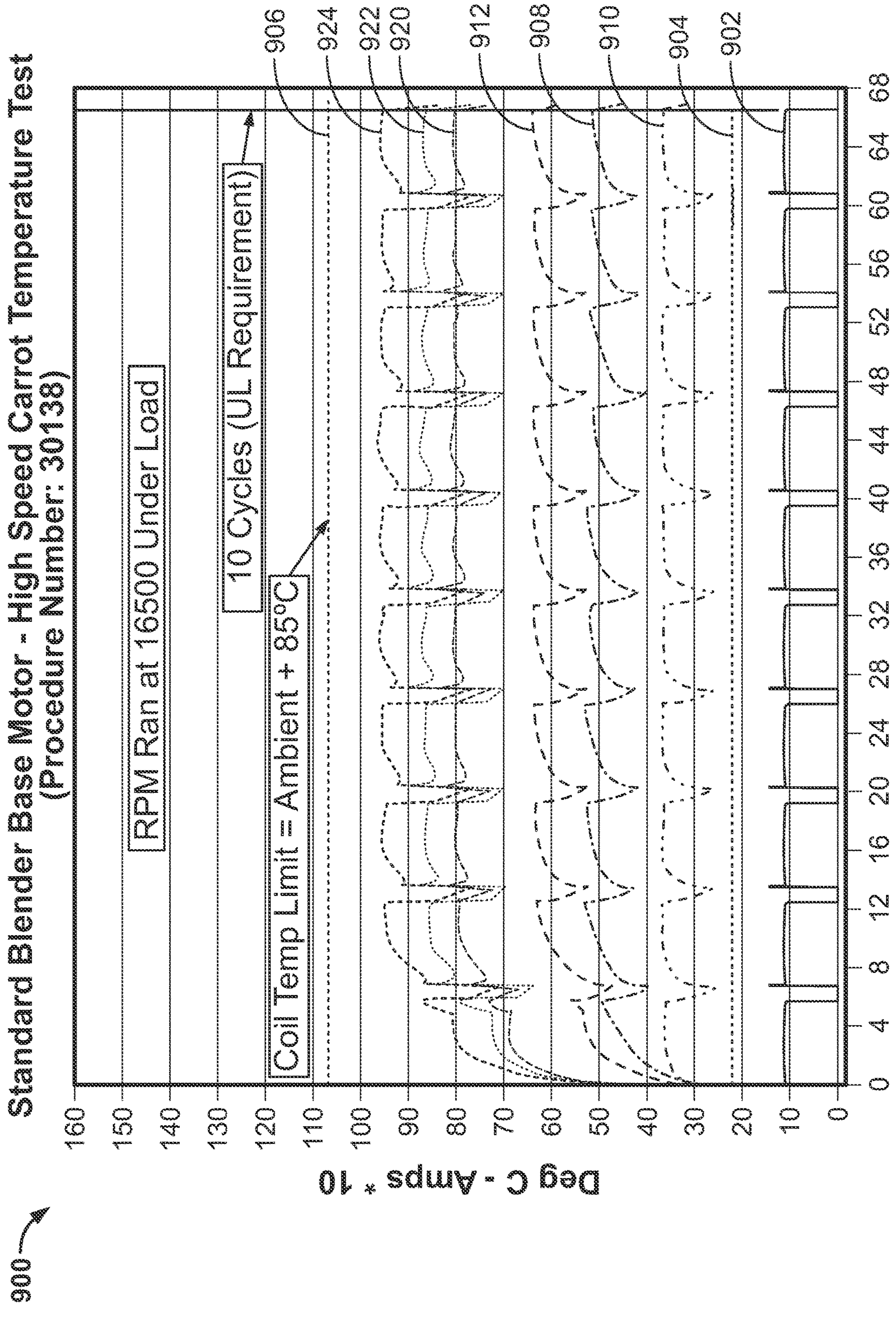
Figure 10:
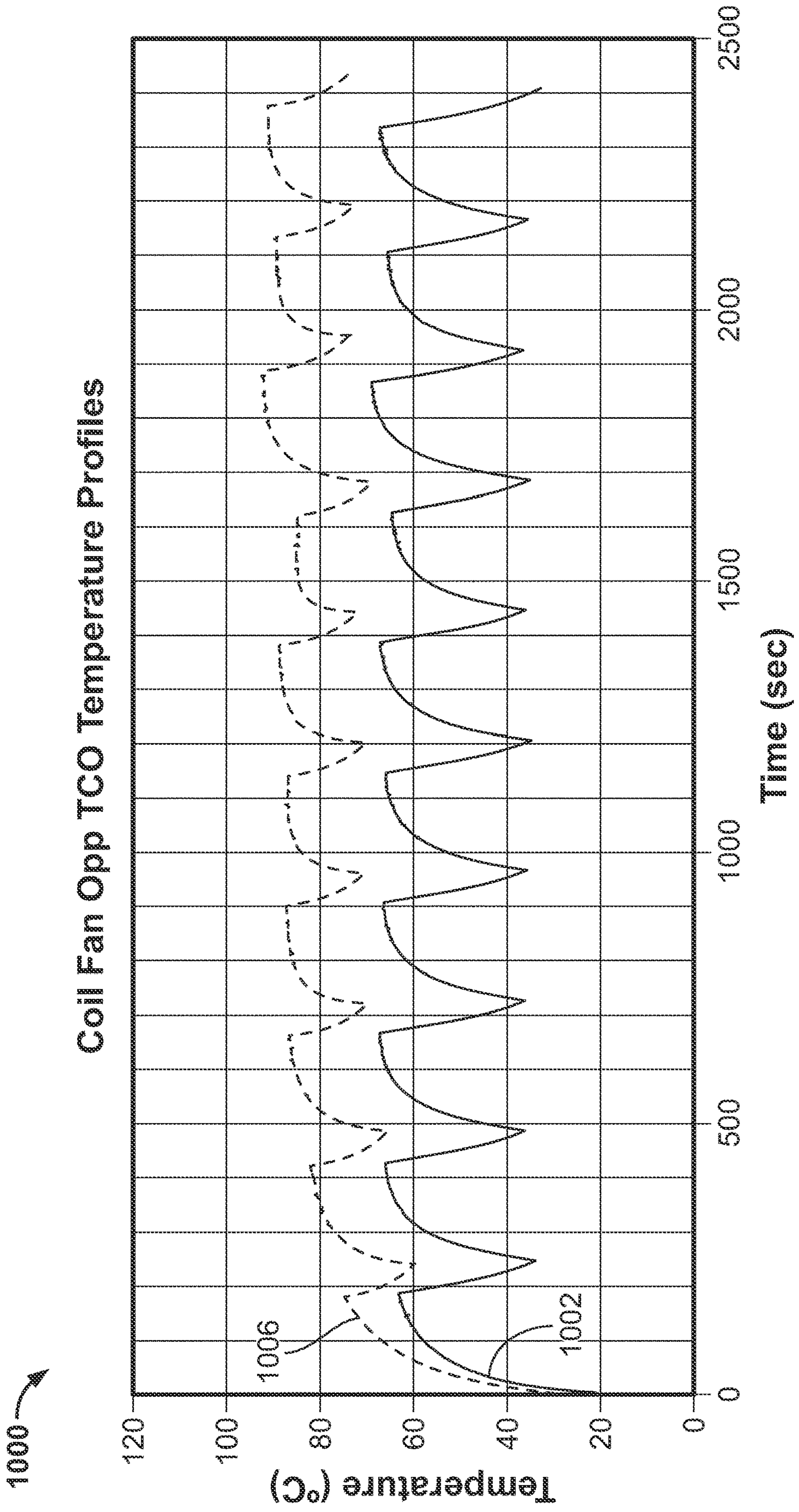

Referring now to FIGS. 8-10, there are exemplary results from various tests illustrated through graphs 800, 900, and 1000. Each of the graphs 800, 900, and 1000 describes temperature (in ° C.) of various components of a blender system—as well as current (in amps×10)—versus time (in minutes) of a blending process. Furthermore, each test included ten cycles, where each cycle included running the motor for 45 minutes followed by a one minute off time. It is noted that the specific temperatures are shown as examples for a particular blending system. As such, temperatures of various other blending systems may vary.

Graph 800, shown in FIG. 8, illustrates results from a test that utilized a blender system with an auxiliary fan. For this test, 2,000 milliliters of water were placed in a 64 ounce container and the motor was run for ten cycles—as described above. The current is shown by line 802. The ambient temperature is shown as line 804 and the coil temperature limit is shown by line 806. This limit describes the maximum temperature threshold for a coil of a motor of the blender system. If the temperature of a coil exceeds this threshold, the test would be labeled as a failed test. As an example, the threshold was set at the ambient temperature plus 85° C.

During the cycles, the temperature of a bridge of the blender system was relatively stable as shown by line 808. The temperatures of a power module and motor case were clustered together around line 810, with the motor case temperature diverging at line 812. The temperature of three coils were also clustered around line 820. It can be seen that line 820 was around 70° C. below line 806—the coil temperature limit—when at its highest point.

Graph 900, shown in FIG. 9, describes results from a test that utilized carrots and water disposed in a container. The container was coupled with a blender base having an auxiliary cooling fan as described herein. It is noted that the carrots added increased resistance to blades within the container. This resulted in an increased workload for a motor of the blender system, which may increase the temperature output of the motor.

Line 902 illustrates the current of the blender system. Similar to graph 800, line 904 illustrates the ambient temperature and line 906 is the coil temperature limit. The temperatures of the bridge (line 908), power module (line 910), and motor case (line 912) were generally lower than the temperatures of the motor coils of a motor of the blender system. Three motor coils had temperatures indicated by line 920, line 922, and line 924. Line 924 was the hottest coil that peeked at 96.6° C., which was below the coil temperature limit indicated by line 906.

Graph 1000, shown in FIG. 10, illustrates the temperature difference between coils of a blender system with an auxiliary fan (line 1002) and coils of a blender system without an auxiliary fan (line 1006). It is noted that each of the blender systems included a container with water and carrots similar to the test described with reference to FIG. 9. As can be seen, line 1002 is lower than the line 1006. The reduced temperature is due, at least in part, to the auxiliary fan. This is because the auxiliary fan may increase the airflow through the blender system, and increase the air flow to the coils.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define embodiments disclosed herein. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for controlling an operation of a blender system, the method comprising:

receiving a user input that instructs adjustment of one or more operating parameters of a fan of the blender system, wherein the blender system comprises at least the fan, a blender base operatively attachable to the blender system, a blender container comprising a blade assembly, a controller configured to adjust the one or more operating parameters of the fan, and a motor used to operatively drive the blade assembly for blending;

determining one or more conditions are met for adjusting the one or more operating parameters of the fan of the blender system, based on at least reception of the user input; and adjusting the one or more operating parameters of the fan to selectively control an operation of the fan based on the one or more conditions being met, wherein the operation of the fan is independent of an operation of the motor.

2. The method of claim 1, wherein:

the blender system further comprises at least one sensor; and determining the one or more conditions are met further comprises:

determining, by the at least one sensor, at least one of a temperature of the motor or air in the blender system; and determining the temperature is greater than a threshold.

3. The method of claim 1, wherein:

the blender system further comprises at least one sensor; and determining the one or more conditions are met further comprises:

determining the motor disposed is in a powered on state to operatively drive the blade assembly; and determining, by the at least one sensor, that at least one of the motor or the blade assembly is inoperative.

4. The method of claim 1, wherein determining the one or more conditions are met further comprises receiving a selection of a blending program.

5. The method of claim 1, wherein determining the one or more conditions are met further comprises detecting the blender system comprises one or more food contents.

6. The method of claim 1, wherein determining the one or more conditions are met further comprises determining a duration of an operation of the motor in a powered on state is greater than a threshold.

7. The method of claim 1, wherein determining the one or more conditions are met further comprises determining a timer has expired.

8. The method of claim 1, wherein determining the one or more conditions are met further comprises:

comparing a current power consumption of the blender system to a maximum power configured for the blender system; and determining the one or more conditions are met based on the comparison.

9. The method of claim 1, wherein the one or more operating parameters of the fan of the blender system comprise at least one of:

an operating speed of the fan; or a powered on or off state of the fan.

10. The method of claim 1, wherein adjusting the one or more operating parameters of the fan comprises increasing or decreasing a speed of the fan.

11. The method of claim 1, wherein adjusting the one or more operating parameters of the fan comprises powering on or powering off the fan.

12. The method of claim 1, wherein:

adjusting the one or more operating parameters of the fan comprises at least one of:

adjusting the one or more operating parameters of the fan to reduce a noise of the blender system; or adjusting the one or more operating parameters of the fan to increase an efficiency level of the blender system.

13. The method of claim 1, wherein the operation of the fan independent of the motor comprises at least one of:

the operation of the fan at a first speed different than a second speed of the motor; or the operation of the fan when the motor is in a powered off state.

* * * * *